US012039364B1

(12) United States Patent
Tkhai

(10) Patent No.: US 12,039,364 B1
(45) Date of Patent: Jul. 16, 2024

(54) ALLOCATING FUNCTIONALITY OF A BLOCK DEVICE DRIVER

(71) Applicant: Virtuozzo International GmbH, Schaffhausen (CH)

(72) Inventor: Kirill Tkhai, Moscow (RU)

( * ) Notice: Subject to any disclaimer, the term of this patent is extended or adjusted under 35 U.S.C. 154(b) by 412 days.

(21) Appl. No.: 17/539,462

(22) Filed: Dec. 1, 2021

(51) Int. Cl.
*G06F 9/48* (2006.01)
*G06F 9/455* (2018.01)
*G06F 9/54* (2006.01)

(52) U.S. Cl.
CPC .......... *G06F 9/485* (2013.01); *G06F 9/45558* (2013.01); *G06F 9/542* (2013.01); *G06F 9/545* (2013.01); *G06F 2009/45579* (2013.01)

(58) Field of Classification Search
CPC ...... G06F 3/038; G06F 3/0662; G06F 13/105; G06F 9/455; G06F 9/45504; G06F 9/45533; G06F 9/45537; G06F 9/45541; G06F 9/45545
See application file for complete search history.

(56) References Cited

U.S. PATENT DOCUMENTS 11,615,042 B2 * 3/2023 Venkataramani ....... G06F 13/22 710/46

* cited by examiner

*Primary Examiner* — Andy Ho

(57) ABSTRACT

Techniques for allocating functionality of a block device driver are described. The described techniques utilize a hybrid architecture including a block device kernel driver that operates at a kernel space layer of the OS and a block device user space component that operates at a user space layer of the OS. Generally, the block device kernel driver performs input/output (I/O) operations on backing files of a block device and the block device user space component performs other operations such as management operations on the backing files of the block device.

20 Claims, 12 Drawing Sheets

ALLOCATING FUNCTIONALITY OF A BLOCK DEVICE DRIVER

TECHNICAL FIELD

The present disclosure is generally related to allocating functionality of a block device driver, and systems and methods for fast and secure processing requests to a block device.

BACKGROUND

Computing operations can be performed at various layers of a computer architecture. For instance, various system-level operations can be performed at a kernel layer whereas more user-facing operations can execute at a user space layer. Conventional software-defined block devices have implementations either completely at a kernel layer and, thus, imply risks of causing critical operating system (OS) errors; or completely at a user space layer and, thus, imply slow performance. In context of virtual execution environments (VEE) (e.g., virtual machines, containers, etc.), a disk for a virtual execution environment may be represented by a block device, and thus, the block device shall have additional features, like resizing or creating a snapshot, which in turn aggravates the above mentioned deficiencies of conventional techniques. Therefore, there is a need for methods and systems for increasing system security and performance by improving the techniques for allocating functionality of a block device driver.

SUMMARY

Techniques for allocating functionality of a block device driver are described. The described techniques utilize a hybrid architecture including a block device kernel driver that operates at a kernel space of the operating system (OS) and a block device user space component that operates at a user space layer of the OS. Generally, the block device kernel driver performs input/output (I/O) operations for a block device and the block device user space component performs other operations such as, for example, management operations for the block device. In some aspects, another way of splitting performance of operations between kernel space and user space may be used. In different aspects, different kinds of operations (operations may be grouped by the type of operation, by operation logic, by estimated time needed to perform the operation, on how often such operation occurs, etc.) may be performed by different modules (by either the block device kernel driver or the block device user space component).

For instance, in at least one aspect it is determined that a management operation is to be performed on a block device, and thus is to be related to block device backing files. Accordingly, the block device kernel driver pauses I/O operations to enable the block device user space component to perform the management operation. While the I/O operations are paused the block device user space component performs the management operation on the block device backing files. After the block device user space component finishes the management operation (or at least finishes changing the backing files), the block device kernel driver is notified and can resume I/O operations. Thus, the described aspects provide for efficient and secure allocation of block device file tasks between a kernel layer and a user space layer of an OS.

Exemplary aspects discussed herein include a method, implemented by at least one computing device, for enabling an operation to be performed on a virtual block device, the method including: receiving a request to perform a management operation on a virtual block device of a virtual execution environment running on a computing system; causing a kernel space driver component to suspend performance of one or more input/output (I/O) operations for the virtual block device; causing, based on suspension of performance of the one or more I/O operations by the kernel space driver component, a user space driver component to perform the management operation on the virtual block device; and causing, based on determining that the management operation is complete, the kernel space driver component to resume performance of I/O operations for the virtual block device.

In addition to the above described method, system and computer-readable storage media storing instructions, any one or more of the following aspects may also exist: wherein the management operation includes one or more of changing a disk size of the virtual block device, creating or removing a snapshot of the virtual block device, modifying metadata of the virtual block device, or moving data within the virtual block device; wherein the user space driver component is operable to perform the management operation on the virtual block device without invoking the kernel space driver component; wherein the kernel space driver component is operable to resume performance of I/O operations on the virtual block device without invoking the user space driver component; wherein the causing the kernel space driver component to suspend performance of one or more I/O operations for the virtual block device includes causing the kernel space driver component to execute one or more current I/O operations and to place one or more subsequent I/O operations into an I/O queue, and wherein the causing the kernel space driver component to resume performance of I/O operations causes the kernel space driver component to perform the one or more subsequent I/O operations from the I/O queue; wherein the causing the kernel space driver component to suspend performance of one or more I/O operations for the virtual block device includes causing the kernel space driver component to suspend performing an I/O operation that involves changing data of the virtual block device, and to continue performing one or more other operations that do not involve changing data of the virtual block device while the user space driver component performs the management operation; further including: determining that performing the management operation causes a change to metadata of the virtual block device; and causing the user space driver component to notify the kernel space driver component of the change to the metadata; further including: determining that performing the management operation causes a change to metadata of the virtual block device; and causing the kernel space driver component to perform one or more of: synchronizing a kernel metadata copy with the change to the metadata; or dropping the kernel metadata copy; further including: receiving a request to perform a further management operation on the virtual block device; and determining that an estimated time to perform the further management operation exceeds a threshold time period; and invoking the kernel space driver component and causing the kernel space driver component to perform the further management operation; wherein the causing the kernel space driver component to resume performance of I/O operations includes: causing the kernel space driver component to perform an I/O operation that causes a change to disk data of the virtual block device; and causing the kernel space driver component to modify metadata of the virtual block device to indicate the change to the disk data.

Exemplary aspects discussed herein include a system for enabling an operation to be performed on a virtual block device, the system including: one or more processors; and one or more storage devices including processor executable instructions that, responsive to execution by the one or more processors, cause the system to perform operations including: receiving a request to perform a management operation on a virtual block device of a virtual execution environment implemented via a computing system; causing a kernel space driver component to suspend performance of one or more input/output (I/O) operations for the virtual block device; causing, based on suspension of performance of the one or more I/O operations by the kernel space driver component, a user space driver component to perform the management operation on the virtual block device; and causing, based on determining that the management operation is complete, the kernel space driver component to resume performance of I/O operations for the virtual block device.

In addition to the above described system, any one or more of the following aspects may also exist: the user space driver component is operable to perform the management operation on the virtual block device without invoking the kernel space driver component; and the kernel space driver component is operable to resume performance of I/O operations on the virtual block device without invoking the user space driver component; wherein the causing the kernel space driver component to suspend performance of one or more I/O operations for the virtual block device includes causing the kernel space driver component to execute one or more current I/O operations and to place one or more subsequent I/O operations into an I/O queue, and wherein the causing the kernel space driver component to resume performance of I/O operations causes the kernel space driver component to perform the one or more subsequent I/O operations from the I/O queue; wherein the causing the kernel space driver component to suspend performance of one or more I/O operations for the virtual block device includes causing the kernel space driver component to suspend performing an I/O operation that involves changing data of the virtual block device, and to continue performing one or more other operations that do not involve changing data of the virtual block device while the user space driver component performs the management operation; the operations further including: determining that performing the management operation causes a change to disk data of the virtual block device; and causing the user space driver component to notify the kernel space driver component of the change to the disk data; the operations further including: determining that performing the management operation causes a change to metadata of the virtual block device; and causing the kernel space driver component to perform one or more of: synchronizing a kernel metadata copy with the change to the metadata; or dropping the kernel metadata copy; wherein the causing the kernel space driver component to resume performance of I/O operations includes: causing the kernel space driver component to perform an I/O operation that causes a change to disk data of the virtual block device; and causing the kernel space driver component to modify metadata of the virtual block device to indicate the change to the disk data.

Exemplary aspects discussed herein include one or more computer-readable storage media storing instructions that are executable by a computing system to perform operations including: receiving a request to perform a management operation for a virtual block device of a virtual execution environment implemented via a computing system; causing a kernel space driver component for the virtual block device to suspend one or more input/output (I/O) operations for the virtual block device; causing a user space driver component to perform the management operation for the virtual block device while the one or more I/O operations are suspended for the virtual block device; and causing the kernel space driver component to resume I/O operations for the virtual block device based on determining that the management operation is terminated.

In addition to the above described computer-readable storage media, any one or more of the following aspects may also exist: wherein the causing the kernel space driver component to suspend one or more I/O operations for the virtual block device includes causing the kernel space driver component to execute one or more current I/O operations and to place one or more subsequent I/O operations into an I/O queue, and wherein the causing the kernel space driver component to resume I/O operations causes the kernel space driver component to perform the one or more subsequent I/O operations from the I/O queue; wherein the causing the kernel space driver component to suspend one or more I/O operations for the virtual block device includes causing the kernel space driver component to suspend performing an I/O operation that involves changing data of the virtual block device, and to continue performing one or more other operations that do not involve changing data of the virtual block device while the user space driver component performs the management operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
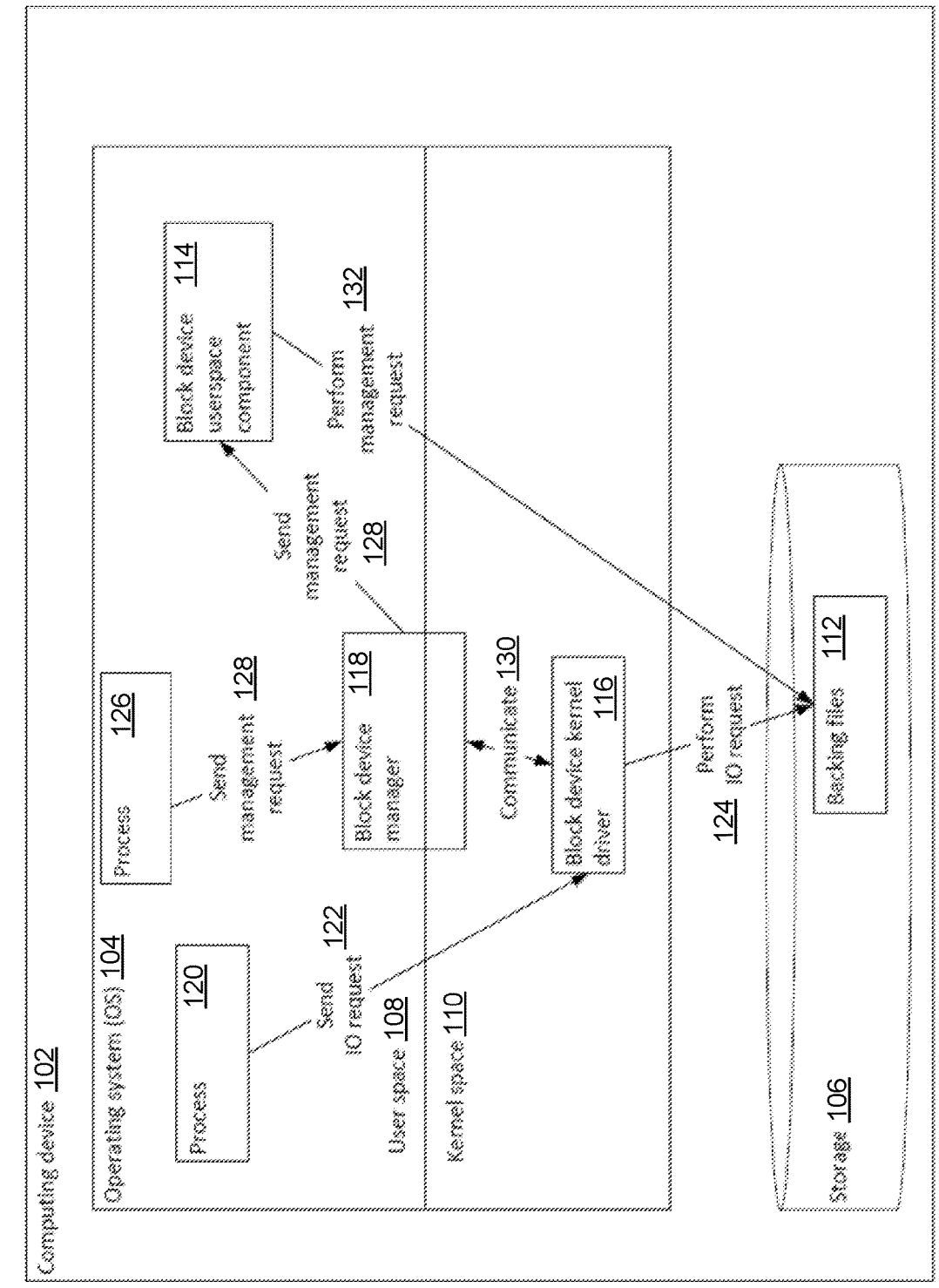
FIG. 1 is an illustration of an environment in an exemplary aspect that is operable to employ allocating functionality of a block device driver as described herein.

To overcome performance and security deficiencies in conventional techniques for performing operations for a block device, techniques for allocating functionality of a block device driver are described.

In some aspects, "block device" comprises a software-defined block device (e.g., a virtual block device), which can be a representation of data stored in a backing file or a set of backing files (e.g., a virtual execution environment disk image). Such block device may be provided to a process or a virtual execution environment (VEE), which then is able to work with the block device as with a hardware block device. In one aspect of the present disclosure, a block device kernel driver and/or block device user space component may use specific in-kernel structures (e.g., as part of the virtual memory that is assigned to the OS kernel), buffers, and so on, to provide and maintain block device functionality to processes such as host OS processes running in the system, or guest OS, or processes running in a container, etc. In one aspect, a block device driver may be implemented as a device-mapper driver. In one aspect, a block device may be a pseudo-device that makes a computer file (backing file or files) accessible as a block device.

In one aspect, backing file is a file (or a set of files) that stores data for a block device (e.g., for virtual block device, virtual disk, VEE virtual disk), wherein a mapping exists between of blocks of block device (or their offsets) and blocks (or a set of blocks) in the file (or their offsets in the file).

In some aspects, backing file(s) may have a complex structure and retrieve data from one or more hardware storage devices or retrieve data from a network as part of storing data and metadata for the block device. Further, the backing file(s) may have a layered structure where each layer contains changes made to the previous layer. For instance, when a portion of data is needed (e.g., that shall be represented by a data block of the block device) a top layer is searched and if the portion of data is not found in the top layer underlying layers can be searched until the portion of data is found. In one aspect, backing file may be in a format describing the block device (e.g., a loop back block device, ploop, qcow2, or etc.).

In one aspect, backing file is a file (or a set of files) that stores data for a block device (e.g., virtual block device, virtual disk, VEE virtual disk), wherein a mapping exists between of blocks of block device (or their offsets) and blocks (or a set of blocks) in the file (or their offsets in the file).

In one aspect, a disk of a virtual execution environment (VEE) (e.g., a container, a virtual machine, and so forth) may be represented by a software-defined block device. Further, data of the virtual execution environment is stored in one or more files, which are backing files for the block device, e.g., virtual execution environment disk image, etc.

In such cases, some specific management operations on block devices are utilized, e.g., resizing or creating a snapshot of the block device.

In one aspect, VEE may be a virtual machine (VM), or a container (CT), or any kind of isolated environment. According to one aspect of the disclosure, a Virtual Execution Environment (VEE) is a type of isolated environment that supports program code execution. Examples of VEEs can be any kind of virtual machines (VMs, including lite VMs), containers (including OS containers, stateless containers, or execution containers), and the like. In some aspects, from the point of view of the user or a process running in the VEE, the code in a virtual execution environment (VEE) runs as if it were running on the real computing system. In one aspect, at least a part of the real hardware or software utilized for running program code are presented in the VEE as their virtual analogs. According to one aspect of the disclosure, a Virtual Machine (VM) is a type of an VEE. In one aspect, several VMs may be running on the same physical machine simultaneously, wherein hardware resources are virtualized. In one aspect, each Virtual Machine instance executes its own OS kernel (i.e., guest OS kernel). In one aspect, support of Virtual Machines is implemented using a Virtual Machine Monitor and/or a Hypervisor. According to one aspect of the disclosure, a container (CT) (e.g., including OS containers, stateless containers, or execution containers) is an isolated environment (e.g., a type of virtual execution environment) that supports program code execution. In some aspects, isolation of containers is implemented on the namespace level. In some aspects, a container is defined as a group of processes isolated from other processes running on the computing device. In some aspects, containers running on the same computing device, share the OS kernel of the computing device and at least some of the system resources. In some aspects, multiple sets of applications or services are organized on a single hardware system by placing them into isolated containers.

Accordingly, the techniques described in this disclosure provide for increased system security and performance by enabling various operations on a block device to be handled by a kernel space block device driver or a user space block device user space component, wherein, in one aspect, the block device kernel driver and a block device user space component (driver) are parts of a block device implementation.

In at least one exemplary aspect, block device management operations are performed by a block device user space component whereas input/output (I/O) operations are performed by a block device kernel driver. In one aspect, for instance, based on receiving a request to perform an I/O operation, a block device kernel driver (e.g., a kernel space driver) accesses block device backing files and performs the I/O operation on the block device backing files. Further, based on receiving a request to perform a block device management operation, the block device kernel driver pauses I/O operations and a block device user space component (e.g., a user space driver) executes the block device management operation on the block device backing files. Generally, this enables performance critical operations (e.g., read, write, discard, etc.) to be performed at the kernel layer and to be performed faster. Further, management operations (e.g., creation of disk image snapshot, increasing disk size or changing characteristics related to block device metadata) may be performed by a block device user space component. In one aspect, the block device user space component can operate on backing files, without invoking block device kernel space driver. In at least one aspect the block device user space component does not access in kernel data structures describing the block device. In one aspect, performing management operations by block device user space component may involve using system calls to an OS kernel, such as part of file operations on backing files.

Further to the described aspects, when a block device user space component is to perform a management operation (e.g., VEE disk management operation), handling of I/O operations by the block device kernel driver is suspended. In one aspect, for instance, the block device kernel driver pauses I/O operations: finishes current I/O requests to block device (e.g., those that were being handled when a command to pause handling I/O requests came) and places any new I/O requests to the block device (including those that may come (e.g., from VEE) while handling I/O operations on the block device are paused) into an I/O queue (or any other data structure) so that they may be handled later. In one aspect, alternatively or additionally the block device kernel driver performs currently pending I/O operations before pausing performance of new I/O operations. In one aspect, during suspension of I/O operations the block device kernel driver temporarily pauses certain operations such as I/O requests, including I/O requests sent by processes inside containers or by guest OS in virtual machines.

In one aspect, the block device represents a disk for a VEE (e.g., a virtual machine or a container, etc.). In one aspect, while handling I/O operations is paused by the block device kernel driver, processes in the VEE are not paused and continue their execution and may possibly generate requests to the VEE disk, which is represented by the block device. In such case, such new requests to the block device that are coming during I/O operations are suspended are saved (e.g., put into I/O queue) to be processed later (e.g., when I/O operations on the block device will be resumed).

In one aspect, after pausing I/O operations on the block device, the block device kernel driver then transfers control to the block device user space component, which performs the required management operation. In one aspect, the block device kernel driver, for instance, notify the block device user space component that I/O operations are suspended and the block device user space component proceeds with performing the management operation.

In at least one aspect, as part of the performing the management operation, the block device user space component is permitted to change a block device backing file (or files if there are several), metadata in the backing file(s), and locations of portions of data in the backing file. The block device user space component, for instance, can perform operations such as moving, creation, discarding, etc., data blocks in backing files describing a block device, creating new backing files, deleting backing files, etc. In one aspect, the block device user space component is not allowed to change the data that is provided by the block device (e.g., can change metadata in the backing files, but cannot change data). Alternatively or additionally the block device user space component is permitted to change data of blocks of a block device, optionally, in such scenarios the block device user space component notifies an OS kernel of the modified data.

In at least one aspect, after the block device user space component finishes performing operations (e.g., management operations) or at least finishes to work with the backing files, the block device user space component notifies the block device kernel driver that I/O operations on a block device can be resumes. Thus, the block device kernel driver can resume performing I/O operations, such as handle I/O operations that were placed in an I/O queue, while the block device user space component performed operations on the block device backing files.

Accordingly, by providing a separate block device user space component and block device kernel driver, the described aspects provide a hybrid architecture that enables efficient split of functionality between a user space and a kernel space modules handling requests to block device. In one aspect, for instance, enhanced performance provided by a kernel space is provided to enable fast I/O operations and other operations (e.g., VEE disk management) are allocated to the user space. The split with enhances both performance and system stability.

In the following discussion, an example environment is first described that may employ the techniques described herein. Example scenarios and procedures are then described which may be performed in the example environment as well as in other environments. Performing the example procedures is not limited to the example environment and the example environment is not limited to performing of the example procedures. Finally, an example system and device are described that are representative of one or more computing systems and/or devices that may perform the various techniques described herein.

Example Environment

FIG. 1 is an illustration of an environment 100 in an exemplary aspect that is operable to employ allocating functionality of a block device driver as described herein. The illustrated environment 100 includes a computing device 102 which may be configured in a variety of ways, such as a hardware server, a desktop computer, a laptop computer, a mobile device (e.g., in a handheld configuration such as a tablet or mobile phone), and so forth. Further, the computing device 102 may be representative of a plurality of different devices, such as, for example, distributed systems or multiple servers utilized to perform operations "over the cloud". An example implementation of the computing device 102 is further described in relation to FIG. 10.

The computing device 102 includes an operating system (OS) 104 and, optionally, storage 106 or a storage access module. The storage 106 may be a part of a computing device, or be connected via network, etc. The storage may store data locally, or via network, may be a shared storage, a distributed storage, a network storage, be a physical storage device (e.g., a physical block device, a RAM, hard disk, etc.), be another virtual block device, or etc. Generally, the OS 104 represents functionality for managing various operations of the computing device 102. The OS 104, for example, abstracts functionality of at least some resources of the computing device 102 (e.g., hardware resources, software resources, system resources, etc.) such as to enable different processes executing on the computing device 102 to access and interact with the resources.

In one aspect, the storage 106 represents data storage resources of the computing device 102, such as hardware storage resources. In at least one aspect the OS 104 generates and manages and/or accesses of portions of the storage 106.

According to various aspects, the OS 104 includes a user space 108 and a kernel space 110. Generally, the user space 108 includes portions of the OS 104 that manage various user-side processes such as software applications with which a user interacts. The kernel space 110 includes portions of the OS 104 that handle various system-level operations such as communicating with hardware resources and managing data storage and data processing resources, such as memory resources (e.g., random access memory (RAM)), data processors (e.g., a central processing unit (CPU)), etc.

Further to the environment 100 the storage 106 stores backing files 112 (e.g., using a file system containing the files). For instance, the backing files 112 contain data stored for a virtual execution environment such as a virtual machine or a container. Generally, the backing files 112 can be accessed in various ways. For instance, the user space 108 includes a block device user space component 114 that represents functionality for block device management operations. Further, the kernel space 110 includes a block device kernel driver 116. In at least one aspect the OS 104 includes and/or accesses a block device manager 118 that represents functionality to synchronize access to the backing files 112 for kernel and user space modules. As further described, however, in at least some aspects the block device manager 118 can be optional. In one aspect, the block device manager 118 is not a separate module, but its functionality is performed by and one or both of the block device kernel driver 116 and block device user space component 114. In some aspects, functionality of the block device manager 118 is allocated in user space, in kernel space or in both.

Processes running on the computing device may send requests to the block device. For example, the figure shows process 120 and process 126, which may be the same process or different processes (e.g., in one aspect the process 120 uses the block device, and the process 126 manages the block device). Each of the processes 120 and/or 120 may be, for example a process running in the virtual environment (e.g., a guest OS of the Virtual Machine (VM), or a process of a Container (CT), etc.) or a host OS process (e.g., a service process that manages the virtual environment parameters (e.g., VEE disk size), a process that interacts with user (e.g., receiving commands from host system administrator, a user of a container, a hypervisor, an application, or etc.)). Further to aspects of allocating functionality of a block device driver, consider a scenario where a process 120 sends an input/output (I/O) request 122 to the block device (e.g., which, while being handled, may imply writing data to and/or reading data from the backing files 112). The process 120, for instance, represents a process that runs in the user space 108. The I/O request 122 is received by the block device kernel driver 116 (or, in another aspect, by the block device manager 118, which will transfer it to the block device kernel driver 116) which accesses the backing files 112 to handle the I/O request 122. For instance, the block device kernel driver 116 executes an I/O operation 124 (e.g., sends a request to a file system on the storage 106 storing the files) on backing files 112 as part of handling the I/O request 122. Thus, the block device kernel driver 116 is operable to enable I/O requests to the block device to be processed, and for example, correspondingly change the backing files 112.

In another example aspect, consider that a process 126 sends a management request 128 to the block device requesting that a management operation be performed on the block device. The block device manager 118 or, in another aspect, the block device user space component 114, or, in yet another aspect, the block device kernel drive 116, receives the management request 128. Based on receiving the management request 128 the block device manager 118 (or, in another aspect, the block device user space component 114) engages in communication 130 with the block device kernel driver 116 requesting the block device kernel driver 116 to pause performing I/O operations on the backing files 112. Accordingly, the block device kernel driver 116 pauses performance of I/O operations and, optionally, as part of the communication 130 notifies the block device manager 118 that I/O operations are paused (or, in another aspect, directly invokes the block device user space component 114). As further described below the block device kernel driver 116 can perform and complete I/O operations that were pending when the communication 130 was initiated, and can then store subsequently received I/O operations or I/O requests in a task queue (or any other data structure, in memory or on disk) to handle them later. In one aspect, the block device manager 118 forwards the management request 128 to the block device user space component 114. Based on the I/O operations being paused by the block device kernel driver 116, the block device user space component 114 executes a management operation 132 on the backing files.

Examples of the management request 128 include an operation performed on the block device associated with the backing files 112, such as changing a disk size of the block device, creating or removing a snapshot of the block device, modifying metadata of the block device, moving data within the block device, defragmentation of the block device, compression/decompression of the block device, deduplication of blocks of the block device, changing metadata format of the block device, changing backing files format of the block device, and so forth.

While this particular aspect is discussed in the context of utilizing the block device manager 118, in at least some aspects the block device manager 118 is optional. For instance, additionally or alternatively to communicating the management request 128 to the block device manager 118, the process 126 can communicate the management request 128 directly to the block device user space component 114. Further, the block device user space component 114 can communicate directly with the block device kernel driver 116 to instruct the block device kernel driver 116 to pause I/O operations, and the block device kernel driver 116 can notify or control transfer to the block device user space component 114 that I/O operations are paused such that the block device user space component 114 can proceed with performing the management operation 132 on the backing files 112. Thus, aspects described herein can utilize the block device manager 118 and are also operable without an instance of the block device manager 118.

Having considered an example environment, consider now a discussion of some example details of the techniques for allocating functionality of a block device driver in an environment in accordance with one or more exemplary aspects.

Details

The following discussion describes some different example scenarios for allocating functionality of a block device driver. While the various actions in the scenarios are discussed in a particular order, it is to be appreciated that the actions can be performed in different orders than those depicted and at least some of the actions may be performed concurrently with one another.

Figure 2A:
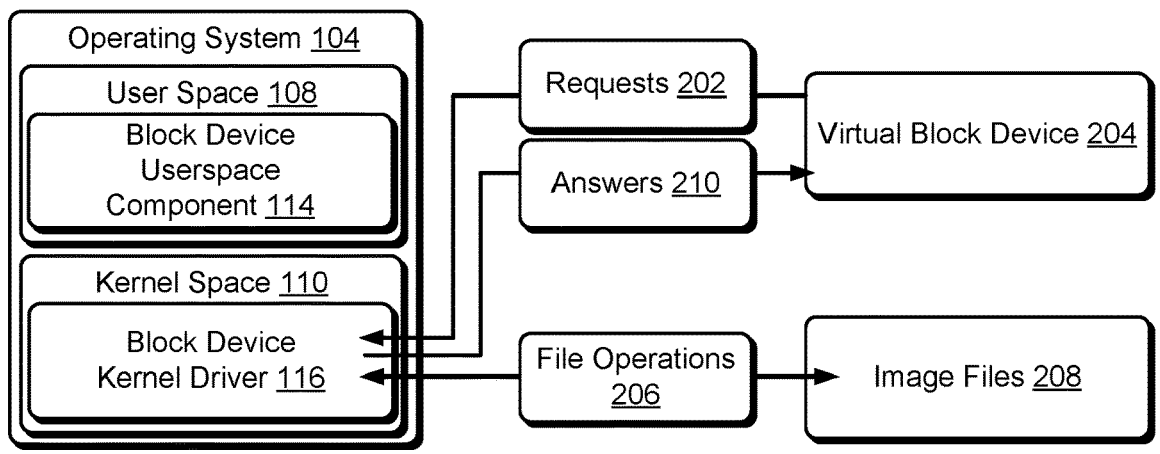
FIG. 2a depicts an example scenario for performing file operations in accordance with one or more aspects.

FIG. 2a depicts an example scenario 200a for performing file operations in accordance with one or more aspects. In the scenario 200a the block device kernel driver 116 receives I/O requests 202 sent to the block device 204 and based on the I/O requests 202 performs file operations 206 (e.g., I/O operations) on backing file(s) of the block device (e.g., image files) 208 of the block device (e.g., virtual block device 204). On the FIG. 2a, FIG. 2b, FIG. 2c, FIG. 2d, FIG. 2e, the image files 208, for instance, are an example of backing files for the virtual block device 204, such as stored on the storage 106. Based on the file operations 206 the block device kernel driver 116 provides answers 210 the caller, which sent a request to the virtual block device 204, that indicate results of the file operations 206.

Figure 2B:
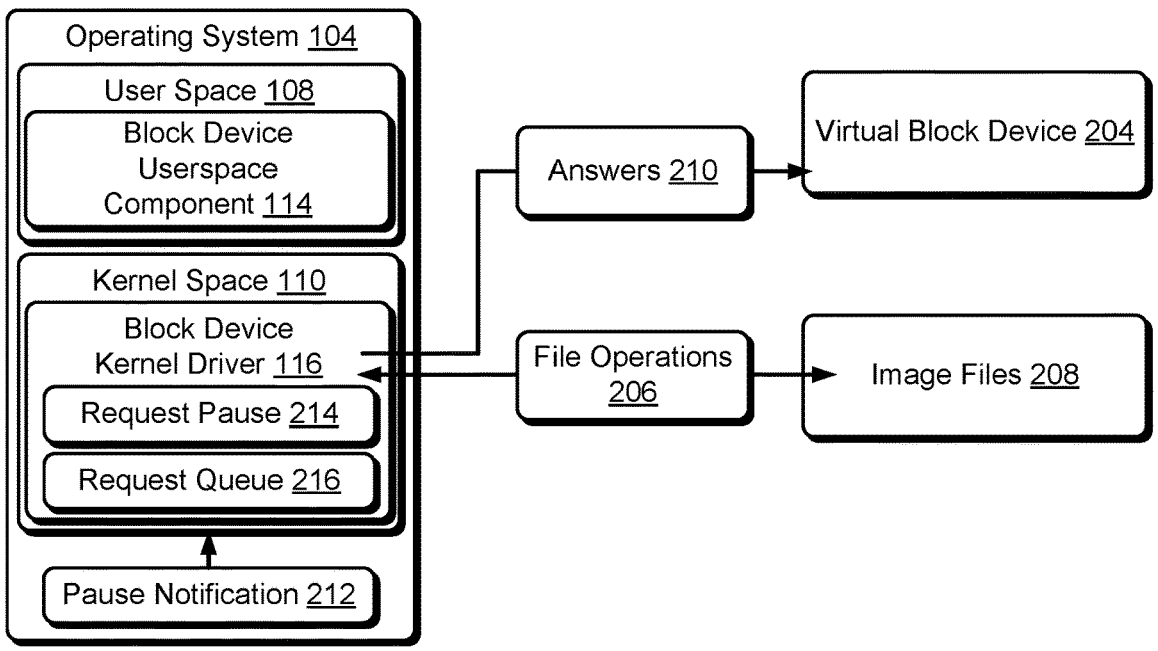
FIG. 2b depicts an example scenario for pausing file operations in accordance with one or more aspects.

FIG. 2b depicts an example scenario 200b for pausing file operations in accordance with one or more aspects. In at least one aspect the scenario 200b represents a continuation of the scenario 200a. In the scenario 200b the block device kernel driver 116 receives a pause notification 212 indicating that the block device kernel driver 116 is to pause performing file operations on the backing file(s) (e.g., image files) 208. The pause notification 212, for instance, occurs based on a request to perform a management operation on the image files 208. Accordingly, the block device kernel driver 116 performs a request pause 214 where at least some requests are paused (e.g., saved instead of being processed immediately). In at least one aspect the block device kernel driver 116 continues performing (e.g., till completion) file operations 206 based on requests 202 that were received prior to the pause notification 212 and pauses (e.g., do not start handling) requests that are received after the pause notification 212. Further, the block device kernel driver 116 places I/O requests received after the pause notification 212 into a request queue 216. Accordingly, after the request pause 214 is started the image files 208 are in a consistent state according to their particular file format.

Figure 2C:
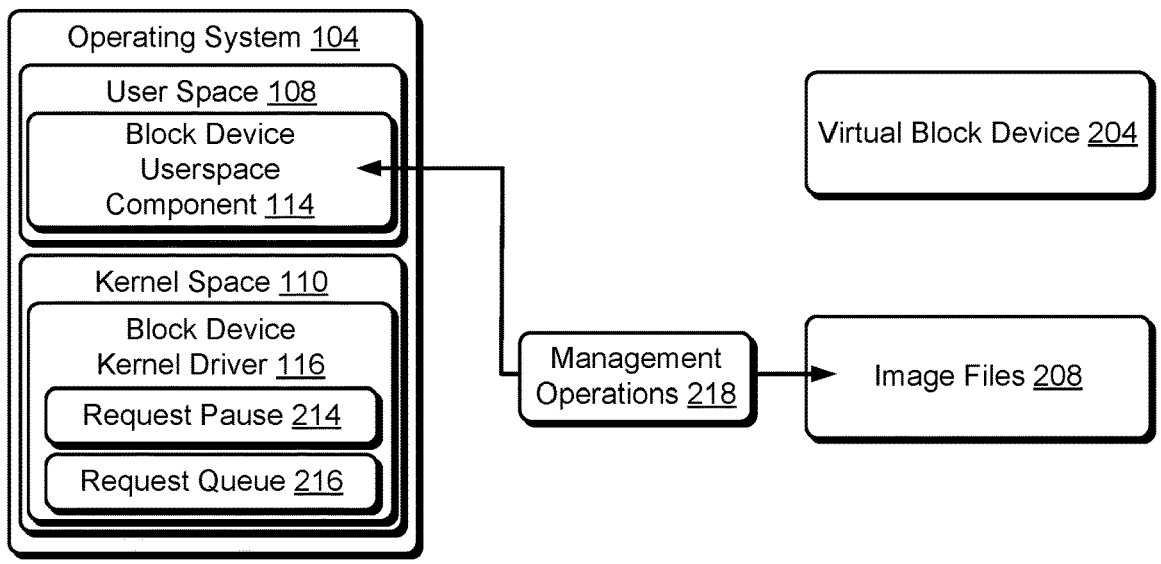
FIG. 2c depicts an example scenario for enabling management operations to be performed in accordance with one or more aspects.

FIG. 2c depicts an example scenario 200c for enabling management operations to be performed in accordance with one or more implementations. The scenario 200c, for instance, represents a continuation of the scenarios 200a, 200b. In the scenario 200c with the request pause 214 made by the block device kernel driver 116, the block device user space component 114 performs management operations 218 on the block device, which may imply accessing the image files 208. Examples of different types of management operations 218 are described throughout this disclosure. Accordingly, after the block device user space component 114 finishes the management operations 218 on the image files 208, the image files 208 are in a consistent state according to their particular file format.

Figure 2D:
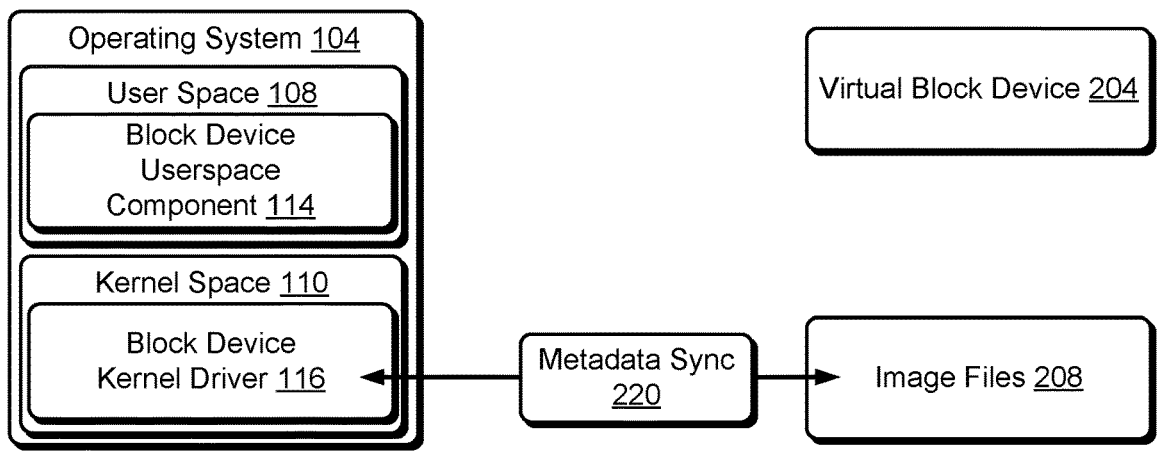
FIG. 2d depicts an example scenario for synchronizing metadata in accordance with one or more aspects.

FIG. 2d depicts an example scenario 200d for synchronizing metadata in accordance with one or more implementations. The scenario 200d, for instance, represents a continuation of the scenarios 200a-200c. In the scenario 200d the block device kernel driver 116 performs a metadata sync 220 where the block device kernel driver 116 synchronizes a copy of the block device metadata (e.g., in kernel cache of metadata) with a current state of metadata of the image files 208, e.g., based on changes to the metadata caused by the management operations 218 performed by the block device user space component 114. Generally, after the metadata sync 220 the block device kernel driver 116 can resume performing file operations on the image files 208.

Figure 2E:
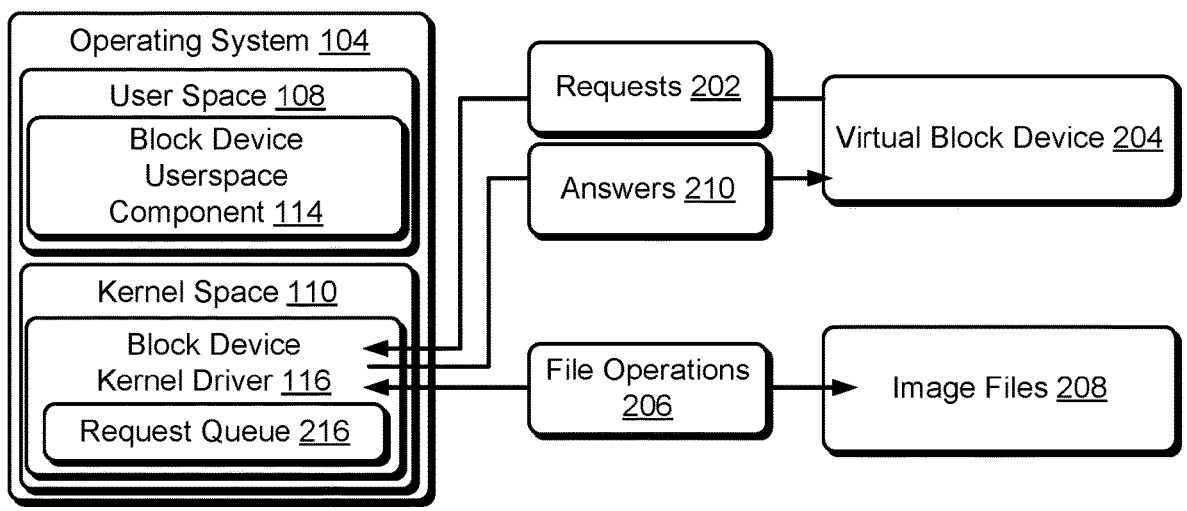
FIG. 2e depicts an example scenario for resuming file operations in accordance with one or more aspects.

FIG. 2e depicts an example scenario 200e for resuming file operations in accordance with one or more implementations. The scenario 200e, for instance, represents a continuation of the scenarios 200a-200d. In the scenario 200e the block device kernel driver 116 resumes performing file operations 206 based on requests 202 and provides answers 210 based on the requests 202 and corresponding file operations 206. In one aspect, for instance, the block device kernel driver 116 performs requests from the request queue 216 as well as newly received requests 202.

Having discussed example details of the techniques for allocating functionality of a block device driver, consider now some example procedures to illustrate additional exemplary aspects of the techniques.

Example Procedures

This section describes example procedures for allocating functionality of a block device driver in one or more exemplary aspects. Exemplary aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some exemplary aspects the procedures are performed by a suitably configured set of devices, such as via the computing device 102 and using exemplary aspects described in the scenarios above.

Figure 3:
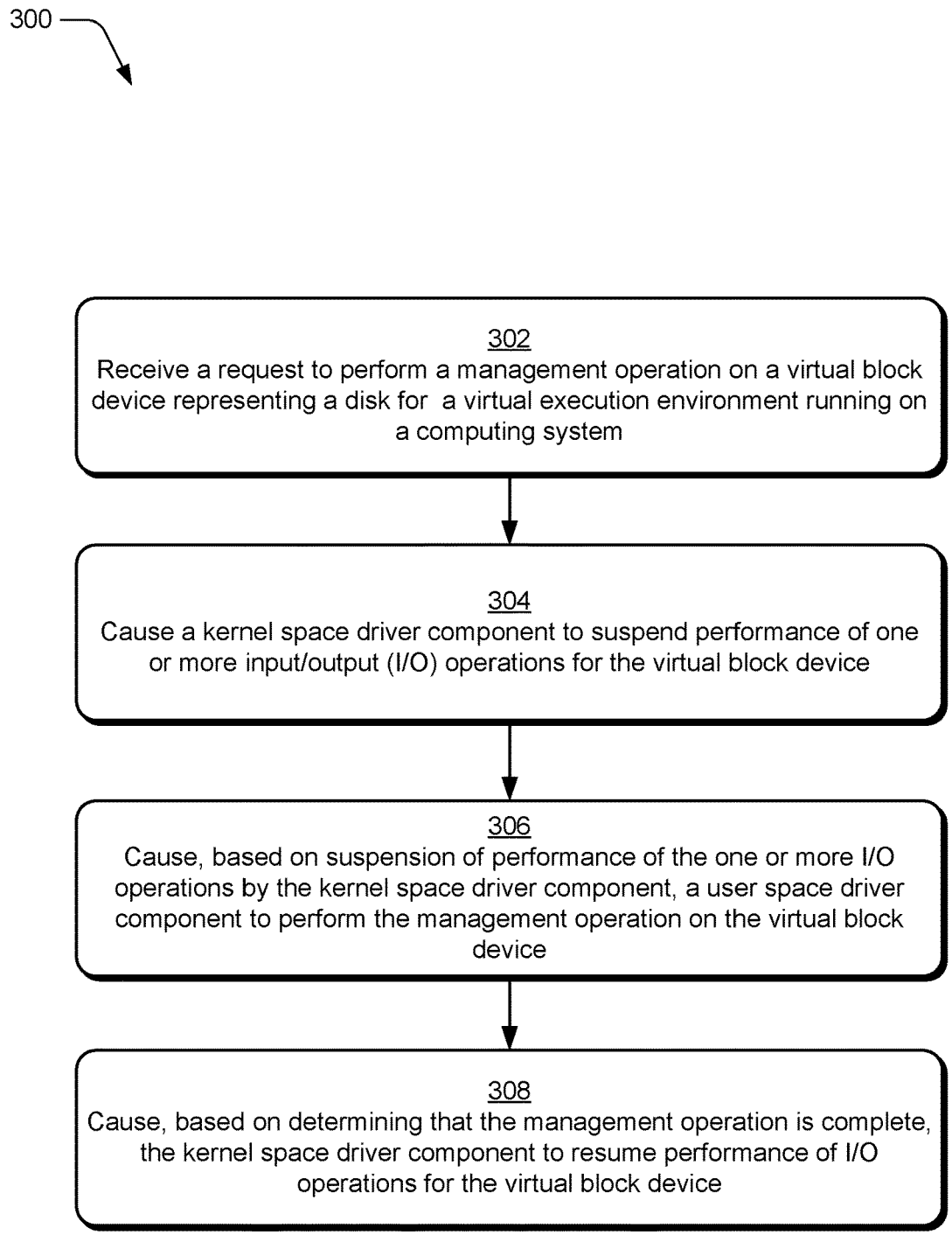
FIG. 3 depicts an example procedure for allocating functionality of a block device driver.

FIG. 3 depicts an example procedure 300 for allocating functionality of a block device driver. Step 302 receives a request to perform a management operation on a block device, e.g. a virtual block device representing a disk for a virtual execution environment running on a computing system. A process executing on the computing device 102, for instance, requests to perform a management operation (e.g., a VEE disk management operation, such as resizing of VEE disk) which implies accessing the backing files 112. In at least one implementation the request is received at the block device manager 118 and/or the block device user space component 114.

Step 304 causes a kernel space driver component to suspend performance of one or more input/output (I/O) operations for the virtual block device. In one aspect, the block device manager 118 and/or the block device user space component 114, for instance, notifies the block device kernel driver 116 to pause performing I/O operations. The block device kernel driver 116 then pauses performing I/O operations. In at least one aspect the block device kernel driver 116 performs and, in one aspect, completes, I/O operations for I/O requests that are received prior to the request to pause I/O operations, and places new I/O requests into an I/O request queue. In at least one aspect the block device kernel driver 116 suspends performing an I/O operation that involves changing data of the virtual block device, and continues performing one or more other operations that do not involve changing data of the virtual block device while the block device user space component 114 performs a management operation. In one aspect, I/O operations of all types are suspended. In another aspect, only some types operations are suspended. In yet another aspect, determining, which operations shall be suspended, depends on the type of the request that shall be performed by the user space component (for example, if a management request implies only reading from the backing files, then kernel driver may proceed handling read I/O operations, and pause only write operations to the backing files).

Step 306 causes, based on suspension of performance of the one or more I/O operations by the kernel space driver component, a user space driver component to perform the management operation on the block device (e.g., virtual block device). For instance, based on determining that the block device kernel driver 116 pauses performing I/O operations, the block device user space component 114 performs a management operation such as on the backing files 112. In at least one aspect the user space driver component 114 is operable to perform the management operation on the virtual block device without invoking the block device kernel driver 116.

Step 308 causes, based on determining that the management operation is complete (or, in one aspect, at least finished write operations to backing files), the kernel space driver component to resume performance of I/O operations for the virtual block device. In one aspect, the block device user space component 114 or, in one aspect, block device manager 118, for instance, notifies the block device kernel driver 116 that block device user space component finished performing file operations with backing files and thus the block device kernel driver 116 resumes I/O operations that were suspended. In at least one aspect the block device kernel driver 116 is operable to resume performance of I/O operations on the virtual block device without invoking the block device user space component 114.

Figure 4:
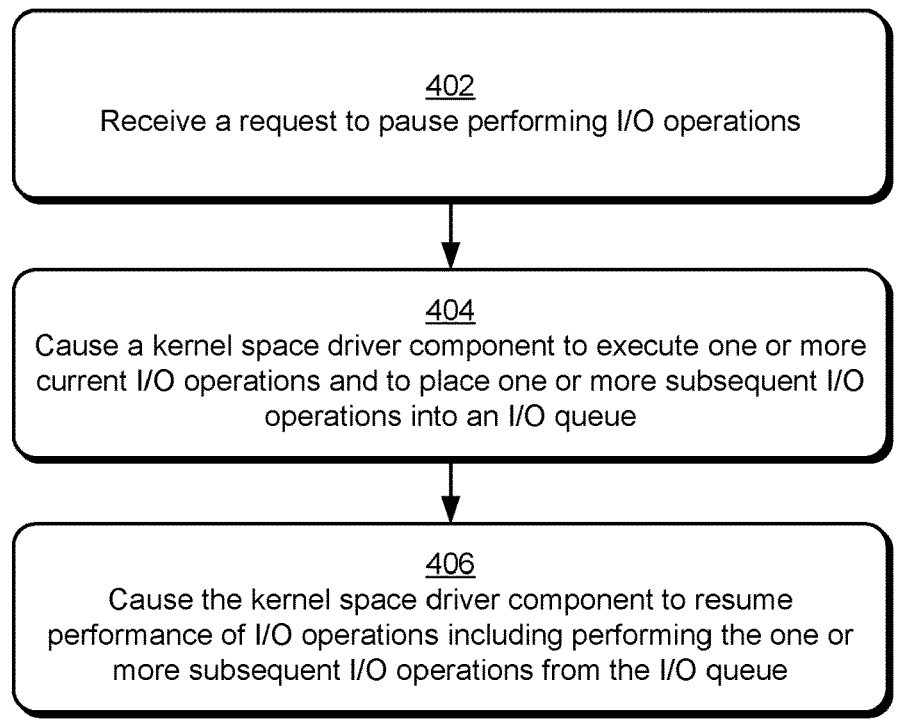
FIG. 4 depicts an example procedure for pausing input/output operations.

FIG. 4 depicts an example procedure 400 for pausing I/O operations. The procedure 400, for instance, is performed by the block device kernel driver 116 in response to an indication for the block device kernel driver 116 to pause performing I/O operations. Step 402 receives a request to pause performing I/O operations. The block device manager 118 and/or the block device user space component 114, for instance, notifies the block device kernel driver 116 to pause performing I/O operations.

Step 404 causes a kernel space driver component to execute one or more current I/O operations and to place one or more subsequent I/O operations into an I/O queue (or in any other way store information about such operations and/or requests so that they can be processed later). In one aspect, the block device kernel driver 116, for instance, handles one or more I/O requests to the block device that are received prior to the request to pause I/O operations. Further, the block device kernel driver 116 places subsequent incoming I/O requests into an I/O queue.

Step 406 causes the kernel space driver component to resume performance of I/O operations including performing the one or more subsequent I/O operations from the I/O queue. For instance, in response to a notification from the block device manager 118 and/or the block device user space component 114, the block device kernel driver 116 resumes performance of I/O operations including handling I/O requests from the I/O queue.

Figure 5:
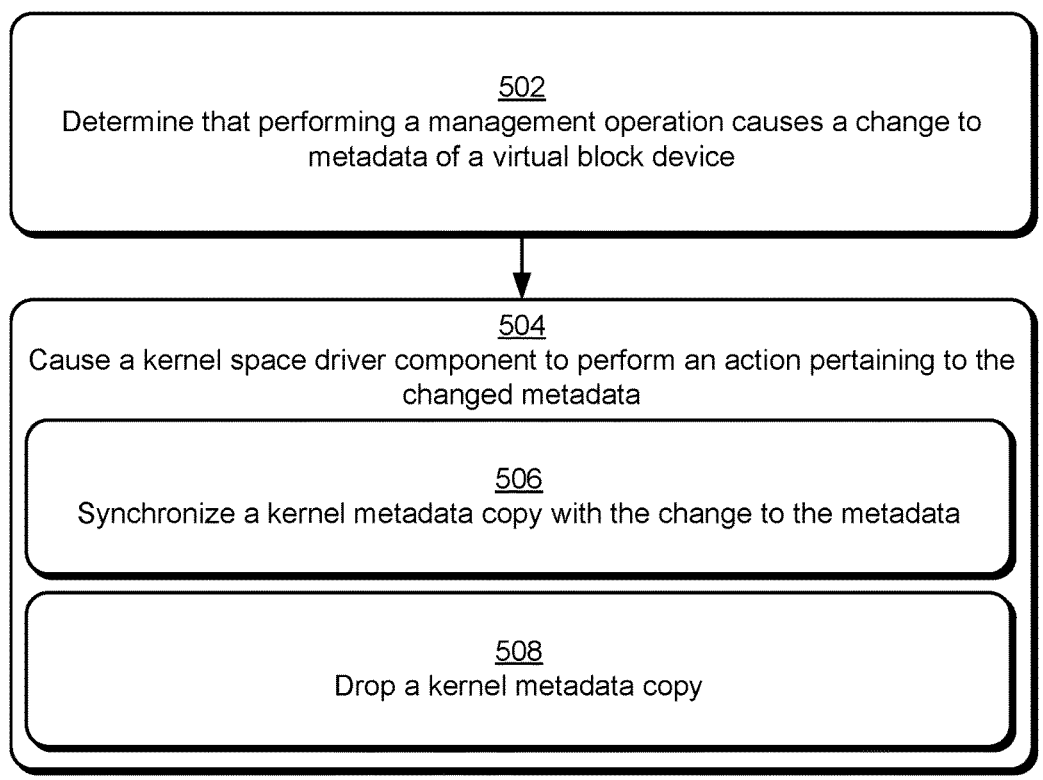
FIG. 5 depicts an example procedure for causing a kernel space driver component to perform an action based on a change to metadata.

FIG. 5 depicts an example procedure 500 for causing a kernel space driver component to perform an action based on a change to metadata. The procedure 500, for instance, in performed in conjunction with one or more of the procedures discussed above. Step 502 determines that performing an operation by the block device user space component causes a change to metadata of a virtual block device. The block device kernel driver 116, for instance, determines that an operation performed by by the block device user space component (e.g., a VEE disk management operation) causes a change to metadata of the backing files 112. In at least one aspect the block device kernel driver 116 receives a notification of the change to metadata such as from the block device user space component 114 and/or the block device manager 118. In one aspect, this step is not performed and the block device kernel driver always performs actions pertaining to the cached metadata copy before resuming I/O operations.

Step 504 causes a kernel space driver component to perform an action pertaining to the changed metadata. In one aspect, the block device kernel driver 116, for instance, performs an action based on determining that metadata has changed. In one aspect, step 506 synchronizes a kernel metadata copy with the change to the metadata. The block device kernel driver 116, for instance, synchronizes its version of metadata with the changed metadata. In another example aspect, step 508 drops a kernel metadata copy. For example, the block device kernel driver 116 drops (e.g., deletes) its current metadata copy. In at least one aspect, the block device kernel driver 116 subsequently generates a new cached metadata version.

Figure 6:
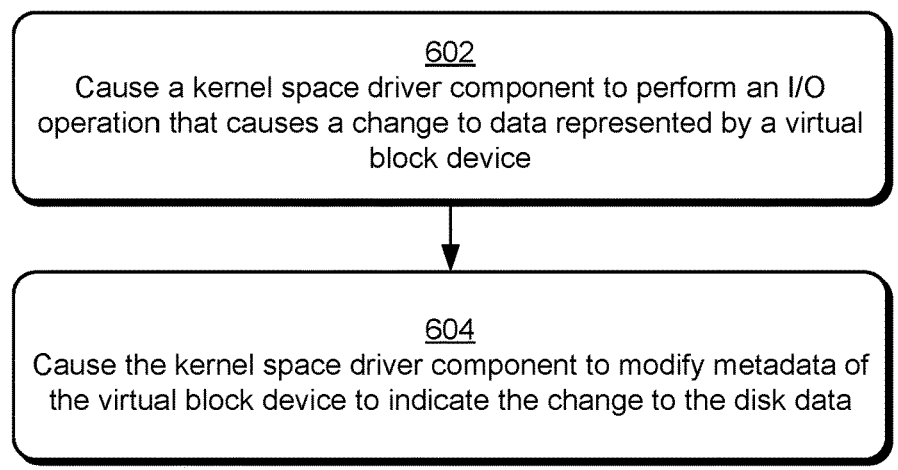
FIG. 6 depicts an example procedure for causing a kernel space driver component to modify metadata.

FIG. 6 depicts an example procedure 600 for causing a kernel space driver component to modify metadata. The procedure 600, for instance, in performed in conjunction with one or more of the procedures discussed above. Step 602 causes a kernel space driver component to perform an I/O operation that causes a change to data represented by a virtual block device. The block device kernel driver 116, for instance, performs an I/O operation that changes data of a virtual block device, such as writing data to the virtual block device.

Step 604 causes the kernel space driver component to modify metadata of the virtual block device to indicate the change to the disk data. For example, the block device kernel driver 116 modifies metadata of the virtual block device to indicate the change to the data.

Figure 7:
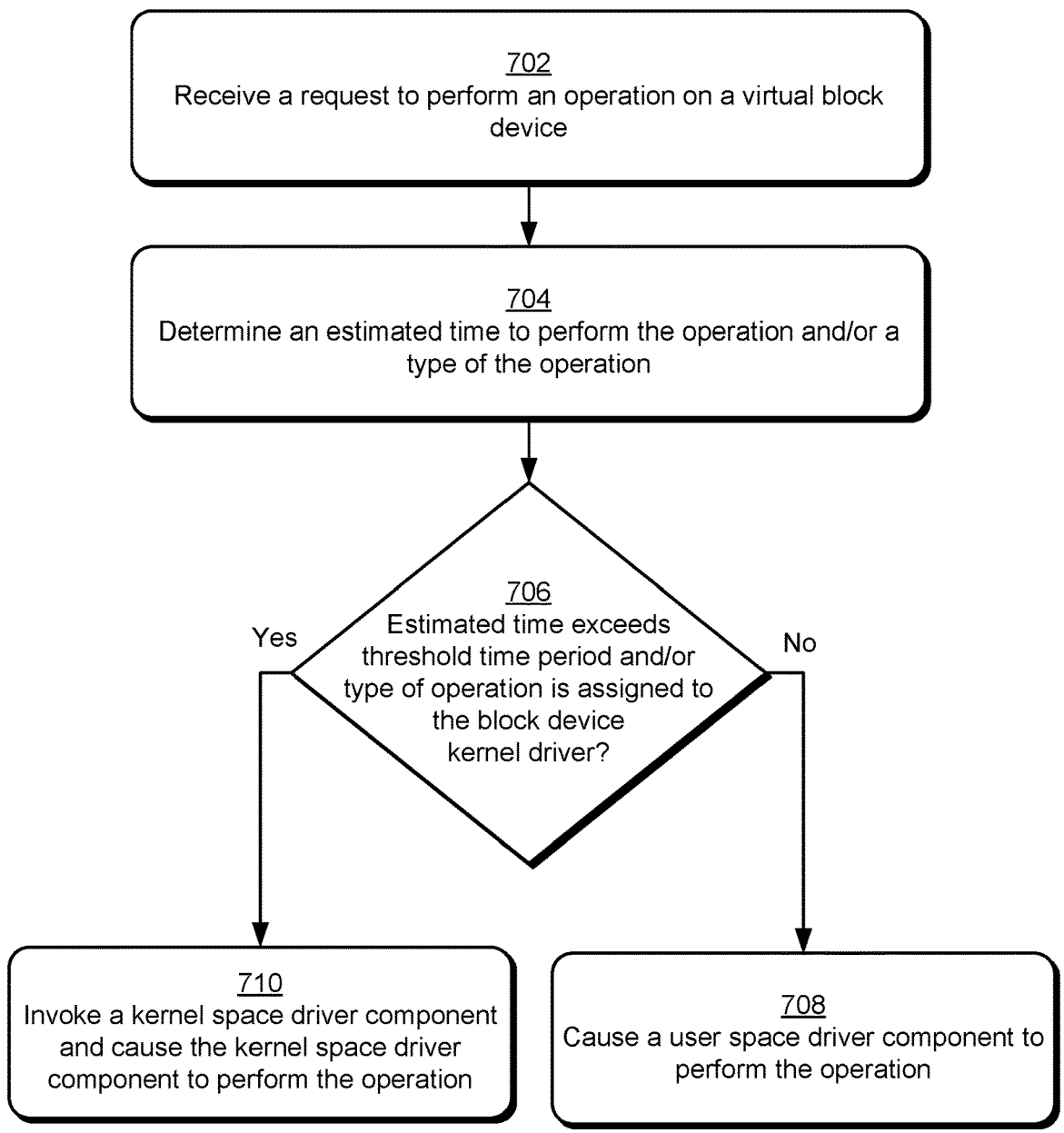
FIG. 7 depicts an example procedure for determining whether a kernel space driver component is to perform an operation.

FIG. 7 depicts an example procedure 700 for determining whether a kernel space driver component is to perform an operation according to an exemplary aspect of the disclosure. In one aspect, the operation may be a VEE disk management operation. In one aspect, the operation may be any kind of request to bock device. The procedure 700, for instance, is performed in conjunction with one or more of the procedures discussed above. In some aspects, the procedure or at least some steps of the procedure may be performed by block device kernel driver, block device user space component or block device manager. Step 702 receives a request to perform an operation on a block device, e.g., virtual block device shown on the figure. The block device kernel driver 116 and/or the block device userspace component 114, and/or block device manager 118, for instance, receives a request from a process (e.g., a host OS process or a process related to a VEE) to perform an operation on a virtual block device.

Step 704 determines an estimated time to perform the operation and/or, in one aspect, a type of the operation. The block device kernel driver 116 and/or the block device userspace component 114, and/or block device manager 118, for instance, estimate an amount of time for performing the operation, such as by the block device user space component 114. Generally, the time estimate for the operation can be based on various factors, such as amount of data involved in the operation, a number of sub-operations included in the operation, an operation type, and so forth.

Step 706 determines whether the estimated time to perform the operation exceeds a threshold time period and/or, in some aspects, determines whether the type of the operation is assigned to be processed by the block device kernel driver. In one aspect, a threshold time period, for instance, is predetermined, such as in milliseconds. If the estimated time to perform the operation does not exceed the threshold time period ("No"), and/or, in one aspect, when the type of the operation corresponds to the block device userspace component (e.g., a management operation, such as a VEE disk management request in case where the block device represents a VEE disk), step 708 causes a user space driver component to perform the operation. In one aspect, for instance, based on determining that the estimated time does not exceed the threshold time period, the block device userspace component 114 performs the management operation.

If the estimated time to perform the operation exceeds the threshold time period ("Yes"), and/or, in one aspect, when the type of the operation corresponds to the block device kernel driver, step 710 invokes a kernel space driver component and causes the kernel space driver component to perform the operation. In one aspect, for instance, based on determining that the estimated time exceeds the threshold time period, the block device kernel driver 116 performs the operation (including, in one aspect, management operations). Generally, this enables the processing power of the kernel space 110 to be leveraged for more complex and/or computationally intensive operations (including, in one aspect, management operations).

Figure 8:
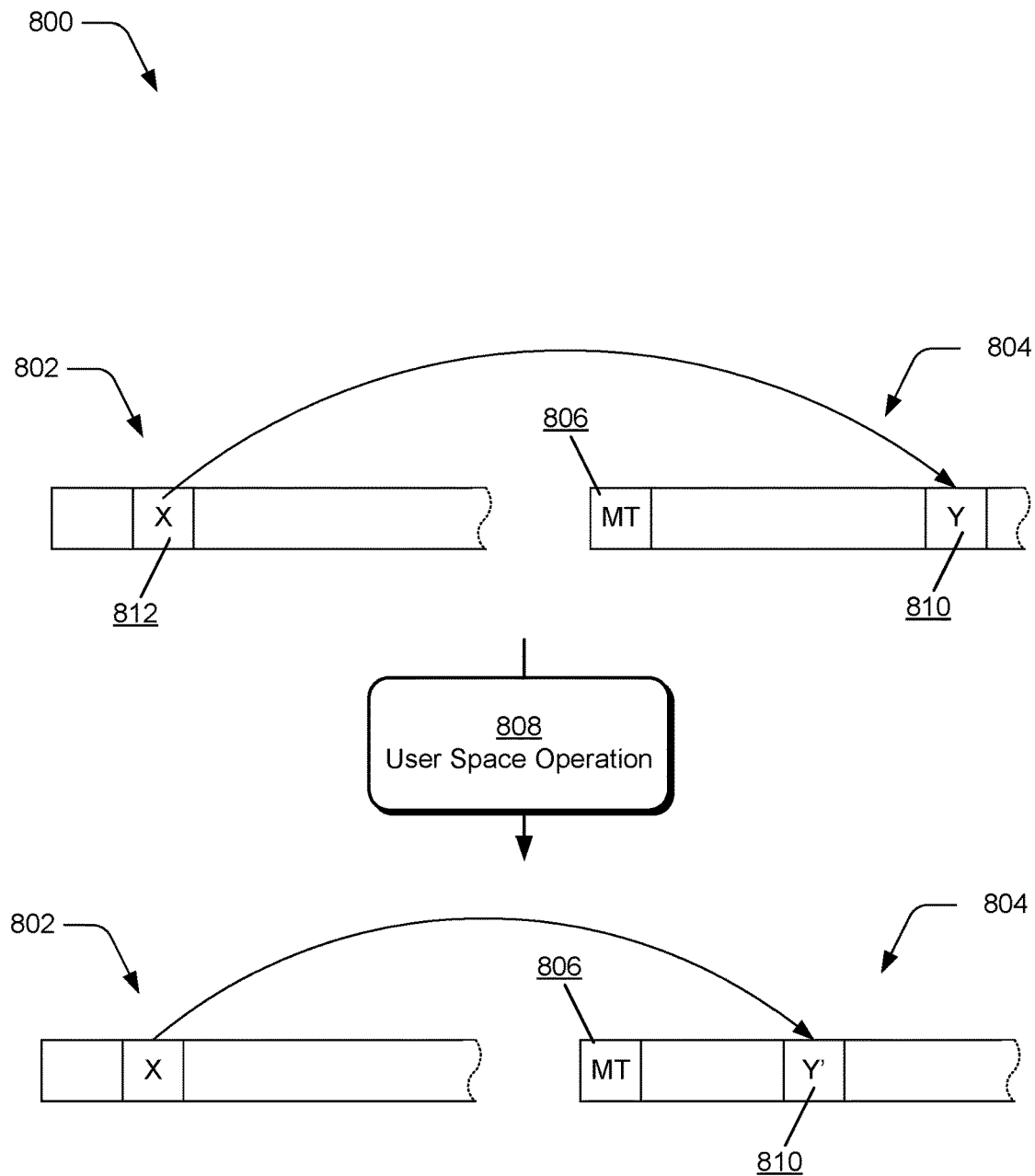
FIG. 8 depicts an example scenario for a user space operation.

FIG. 8 depicts an example scenario 800 for a user space operation. The scenario 800 includes a block device 802 and a backing file (e.g., an image file) 804 for the block device 802. The backing file (e.g., image file) 804, for instance, stores data for the block device 802. Further, the backing file (e.g., image file) 804 maintains a mapping table 806 that indicates mappings between blocks of the block device 802 and/or their offsets and/or blocks in the backing file (e.g., image file) 804 and/or their offsets and/or, in one aspect, their compressed representations, in the backing file (e.g., image file) 804. In at least one implementation the block device 802 represents a loop back block device and the a backing file (e.g., image file) 804 is formatted to describe the block device 802. In one aspect, the mapping table 806, for instance, correlates blocks of the block device 802 (e.g., a VEE virtual disk) with one block or a set of corresponding blocks (e.g., disk clusters) in files where data contents are stored.

Further to the exemplary scenario 800 a user space operation 808 is performed, such as by the block device user space component 114, to operate on a block 810 in a backing file, which represents a block 812 of the block device 802. The user space operation 808, for instance, moves the block 810 to a different position (e.g., address) in the backing file (e.g., image file) 804. In this example, the user space operation 808 operates on the block 810 without changing data of the block 810. For instance, the block 810 is moved without changing its data. Further, the mapping table 806 is updated to indicate a new location of the block 810 in the backing file (e.g., image file) 804. Alternatively or additionally the user space operation 808 changes a size of the file and/or of the block 810 (e.g., increases a size), and in such an aspect the mapping table 806 is updated to indicate the changed size of the file and/or of the block 810. While the backing file(s) (e.g., image file) 804 is discussed with reference to a loop back device format (e.g., ploop), aspects described herein can utilize any suitable format such as the QEMU Copy On Write (Qcow2) format and/or any other suitable format.

Figure 9:
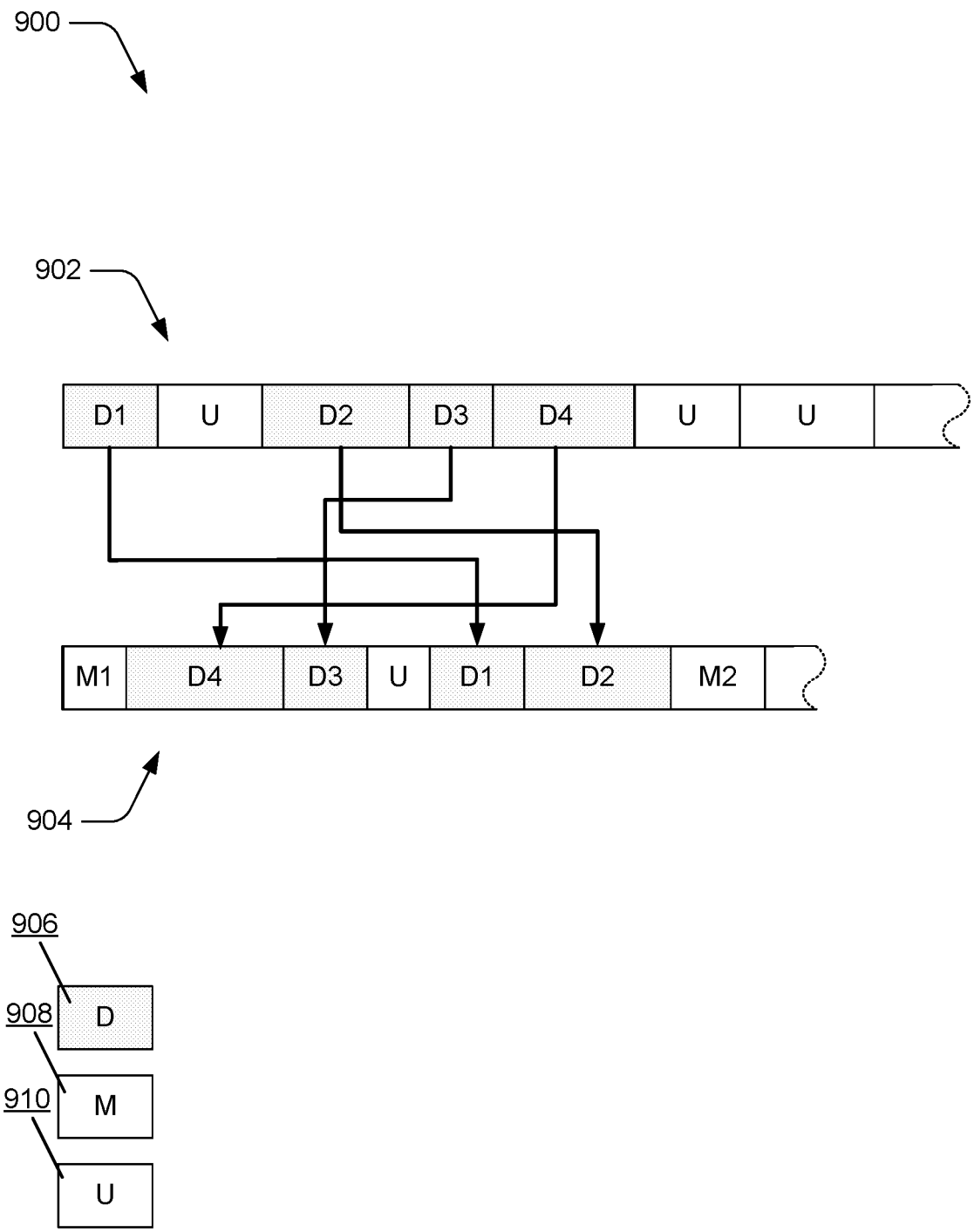
FIG. 9 depicts an example scenario for a mapping of a block device to a backing file.

FIG. 9 depicts an example scenario 900 for a mapping of a block device to backing file (e.g., an image file). The scenario 900 includes a block device 902 and a backing file (e.g., an image file) 904. Further, the block device 902 and the backing file (e.g., image file) 904 include various blocks including data blocks 906, metadata blocks 908, and unused blocks 910. In at least one implementation the backing file(s) (e.g., image file) 904 represents backing files for the block device 902, e.g., a representation of an instance of the backing files 112. In different aspects, depending on the backing file format, size of blocks, location of metadata, etc. may differ, moreover, blocks may be compressed or not.

Accordingly, the described techniques can be employed to provide for efficient and secure allocation of tasks pertaining to a block device. Having described example procedures in accordance with one or more exemplary aspects, consider now an example system and device that can be utilized in the various techniques described herein.

Example System and Device

Figure 10:
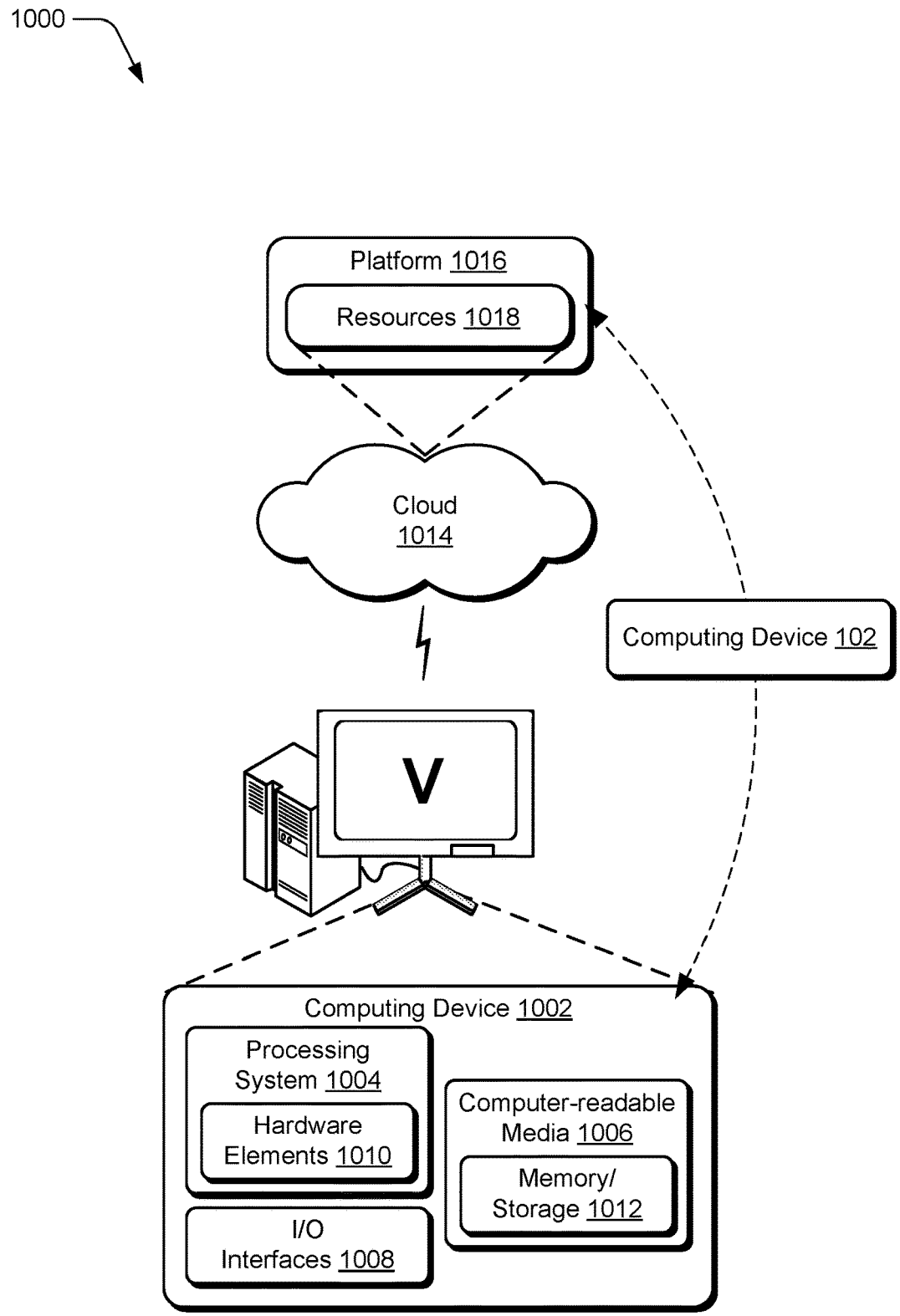
FIG. 10 illustrates an example system that includes an example computing system that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the computing device 102. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "node," "engine," and "component" as used herein generally represent software, firmware, hardware, or a combination thereof. The features of the techniques described herein are platform-independent, meaning that the techniques may be performed on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some exemplary aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a wireless cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, implemented by at least one computing device, for enabling an operation to be performed on a virtual block device, the method comprising:
   receiving a request to perform a management operation on a virtual block device of a virtual execution environment;

causing a kernel space driver component to suspend performance of one or more input/output (I/O) operations for the virtual block device;

causing, based on suspension of performance of the one or more I/O operations by the kernel space driver component, a user space driver component to perform the management operation on the virtual block device; and causing, based on a notification from the user space driver component, the kernel space driver component to resume performance of I/O operations for the virtual block device.

2. The method of claim 1, wherein the management operation comprises one or more of changing a disk size of the virtual block device, creating or removing a snapshot of the virtual block device, modifying metadata of the virtual block device, or moving data within the virtual block device.

3. The method of claim 1, wherein the user space driver component is operable to perform the management operation on the virtual block device without invoking the kernel space driver component.

4. The method of claim 1, wherein the kernel space driver component is operable to resume performance of I/O operations on the virtual block device without invoking the user space driver component.

5. The method of claim 1, wherein said causing the kernel space driver component to suspend performance of one or more I/O operations for the virtual block device comprises causing the kernel space driver component to execute one or more current I/O operations on the virtual block device backing files and to place one or more subsequent I/O operations into an I/O queue, and wherein said causing the kernel space driver component to resume performance of I/O operations causes the kernel space driver component to perform the one or more subsequent I/O operations from the I/O queue.

6. The method of claim 1, wherein said causing the kernel space driver component to suspend performance of one or more I/O operations for the virtual block device comprises causing the kernel space driver component to suspend performing an I/O operation that involves changing data of the virtual block device, and to continue performing one or more other operations that do not involve changing data of the virtual block device while the user space driver component performs the management operation.

7. The method of claim 1, further comprising:
determining that performing the management operation causes a change to metadata of the virtual block device; and
causing the user space driver component to notify the kernel space driver component of the change to the metadata.

8. The method of claim 1, further comprising:
determining that performing the management operation causes a change to metadata of the virtual block device; and
causing the kernel space driver component to perform one or more of:
synchronizing a kernel metadata copy with the change to the metadata; or
dropping the kernel metadata copy.

9. The method of claim 1, further comprising:
receiving a request to perform a further management operation on the virtual block device;
determining that an estimated time to perform the further management operation exceeds a threshold time period; and invoking the kernel space driver component and causing the kernel space driver component to perform the further management operation.

10. The method of claim 1, wherein said causing the kernel space driver component to resume performance of I/O operations comprises:
causing the kernel space driver component to perform an I/O operation that causes a change to disk data of the virtual block device; and
causing the kernel space driver component to modify metadata of the virtual block device to indicate the change to the disk data.

11. A system for enabling an operation to be performed on a virtual block device, the system comprising:
one or more processors; and
one or more storage devices comprising processor executable instructions that, responsive to execution by the one or more processors, cause the system to perform operations comprising:
receiving a request to perform a management operation on a virtual block device of a virtual execution environment;
causing a kernel space driver component to suspend performance of one or more input/output (I/O) operations for the virtual block device;
causing, based on suspension of performance of the one or more I/O operations by the kernel space driver component, a user space driver component to perform the management operation on the virtual block device; and
causing, based on a notification from the user space driver component, the kernel space driver component to resume performance of I/O operations for the virtual block device.

12. The system of claim 11, wherein:
the user space driver component is operable to perform the management operation on the virtual block device without invoking the kernel space driver component; and
the kernel space driver component is operable to resume performance of I/O operations on the virtual block device without invoking the user space driver component.

13. The system of claim 11, wherein said causing the kernel space driver component to suspend performance of one or more I/O operations for the virtual block device comprises causing the kernel space driver component to execute one or more current I/O operations and to place one or more subsequent I/O operations into an I/O queue, and wherein said causing the kernel space driver component to resume performance of I/O operations causes the kernel space driver component to perform the one or more subsequent I/O operations from the I/O queue.

14. The system of claim 11, wherein said causing the kernel space driver component to suspend performance of one or more I/O operations for the virtual block device comprises causing the kernel space driver component to suspend performing an I/O operation that involves changing data of the virtual block device, and to continue performing one or more other operations that do not involve changing data of the virtual block device while the user space driver component performs the management operation.

15. The system of claim 11, the operations further comprising:
determining that performing the management operation causes a change to disk data of the virtual block device; and causing the user space driver component to notify the kernel space driver component of the change to the disk data.

16. The system of claim 11, the operations further comprising:
   determining that performing the management operation causes a change to metadata of the virtual block device; and
   causing the kernel space driver component to perform one or more of:
      synchronizing a kernel metadata copy with the change to the metadata; or
      dropping the kernel metadata copy.

17. The system of claim 11, wherein said causing the kernel space driver component to resume performance of I/O operations comprises:
   causing the kernel space driver component to perform an I/O operation that causes a change to disk data of the virtual block device; and
   causing the kernel space driver component to modify metadata of the virtual block device to indicate the change to the disk data.

18. One or more computer-readable storage media storing instructions that are executable by a computing system to perform operations comprising:
   receiving a request to perform a management operation for a virtual block device of a virtual execution environment;
   causing a kernel space driver component for the virtual block device to suspend one or more input/output (I/O) operations for the virtual block device;
   causing a user space driver component to perform the management operation for the virtual block device while the one or more I/O operations are suspended for the virtual block device; and
   causing the kernel space driver component to resume I/O operations for the virtual block device based on a notification from the user space driver component.

19. The one or more computer-readable storage media of claim 18, wherein said causing the kernel space driver component to suspend one or more I/O operations for the virtual block device comprises causing the kernel space driver component to execute one or more current I/O operations and to place one or more subsequent I/O operations into an I/O queue, and wherein said causing the kernel space driver component to resume I/O operations causes the kernel space driver component to perform the one or more subsequent I/O operations from the I/O queue.

20. The one or more computer-readable storage media of claim 18, wherein said causing the kernel space driver component to suspend one or more I/O operations for the virtual block device comprises causing the kernel space driver component to suspend performing an I/O operation that involves changing data of the virtual block device, and to continue performing one or more other operations that do not involve changing data of the virtual block device while the user space driver component performs the management operation.

* * * * *